US012132654B2

(12) United States Patent
Szigeti et al.

(10) Patent No.: US 12,132,654 B2
(45) Date of Patent: Oct. 29, 2024

(54) DYNAMIC INTENT-BASED QOS POLICIES FOR COMMANDS WITHIN INDUSTRIAL PROTOCOLS (71) Applicant: Cisco Technology, Inc., San Jose, CA (US)

(72) Inventors: Thomas Szigeti, Vancouver (CA); David John Zacks, Vancouver (CA); Robert E. Barton, Richmond (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/223,176

(22) Filed: Apr. 6, 2021

(65) Prior Publication Data

US 2022/0321467 A1 Oct. 6, 2022

(51) Int. Cl.
*G06F 15/16* (2006.01)
*H04L 45/00* (2022.01)
(Continued)

(52) U.S. Cl.
CPC ............ *H04L 45/566* (2013.01); *H04L 45/24* (2013.01); *H04L 45/302* (2013.01); *H04L 45/52* (2013.01); *H04L 45/74* (2013.01)

(58) Field of Classification Search
CPC ..... H04L 45/566; H04L 45/24; H04L 45/302; H04L 47/2475; H04L 47/803;
(Continued)

(56) References Cited

U.S. PATENT DOCUMENTS 8,745,185 B1 * 6/2014 Salo ........................ H04L 63/06
709/223
10,243,860 B2 3/2019 Szilágyi et al.
(Continued)

FOREIGN PATENT DOCUMENTS

| CN | 112073388 A | * | 12/2020 | ............. H04L 49/10 |
| EP | 2712130 A1 | * | 3/2014 | ......... H04L 47/2433 |
| WO | WO-02054689 A2 | * | 7/2002 | ....... H04L 29/06027 |

OTHER PUBLICATIONS

FuHong Guo and YanYing Chen, "Under production capacity constraints analysis of and quality differentiated motivation of service enterprise," 2017 International Conference on Service Systems and Service Management, Dalian, China, 2017, pp. 1-4, (Year: 2017).*

(Continued)

*Primary Examiner* — Oscar A Louie
*Assistant Examiner* — Messeret F Gebre
(74) *Attorney, Agent, or Firm* — BEHMKE INNOVATION GROUP LLC; James M. Behmke; James J. Wong (57) ABSTRACT

According to one or more embodiments of the disclosure, a service identifies a packet sent by a first device in a network to a second device as being of a particular protocol. The service identifies a control command within the packet for the second device, based in part on the particular protocol identified for the packet. The service determines, based on the control command within the packet, a quality of service policy for the packet. The service causes the quality of service policy to be applied to the packet along a path in the network via which the packet is sent from the first device to the second device.

16 Claims, 9 Drawing Sheets (51) Int. Cl.
*H04L 45/24* (2022.01)
*H04L 45/302* (2022.01)
*H04L 45/52* (2022.01)
*H04L 45/74* (2022.01)

(58) Field of Classification Search
CPC .................. H04L 47/805; H04L 69/24; H04L 29/060537; H04L 67/61; H04L 47/2408; H04L 47/2416; H04L 47/2425; H04L 47/2433; H04L 47/24; H04L 47/2441; H04L 47/2458; H04L 63/0236; H04L 63/0245
See application file for complete search history.

(56) References Cited

U.S. PATENT DOCUMENTS

| | | | |
|---|---|---|---|
| 10,320,613 | B1 | 6/2019 | Cam-Winget et al. |
| 10,594,560 | B2 | 3/2020 | Prasad et al. |
| 10,601,664 | B2 | 3/2020 | Kumar et al. |
| 11,240,157 | B1* | 2/2022 | Callaghan ............... H04L 69/22 |
| 2011/0196952 | A1* | 8/2011 | Pape ..................... H04W 76/12 709/223 |
| 2013/0077486 | A1* | 3/2013 | Keith ................. H04L 47/2433 370/230.1 |
| 2014/0250218 | A1* | 9/2014 | Gochi Garcia ......... H04L 47/19 709/223 |
| 2015/0110009 | A1* | 4/2015 | Berzin ................. H04L 45/302 370/329 |
| 2016/0112896 | A1* | 4/2016 | Karampatsis ..... H04W 28/0268 370/230.1 |
| 2017/0085490 | A1* | 3/2017 | Sachs ...................... H04L 47/50 |
| 2018/0375836 | A1* | 12/2018 | Salo ................... H04L 47/2441 |
| 2019/0230682 | A1* | 7/2019 | Tang ..................... H04W 76/15 |
| 2020/0007398 | A1 | 1/2020 | Gaikwad et al. |

OTHER PUBLICATIONS

Hou, R., Zhang, L., Zheng, Y., Chang, Y., Li, B., Huang, T., & Luo, J. (Jul. 15, 2019). Service-differentiated QoS routing based on ant colony optimisation for named data networking. Peer-to-Peer Networking and Applications, 12(4), 740-50. (Year: 2019).*

A. Binsahaq, T. R. Sheltami and K. Salah, "A Survey on Autonomic Provisioning and Management of QoS in SDN Networks," in IEEE Access, vol. 7, pp. 73384-73435, 2019 (Year: 2019).*

Yu, et al., "QOS-aware Traffic Classification Architecture Using Machine Learning and Deep Packet Inspection in SDNs", Procedia Computer Science, vol. 131, 8th International Congress of Information and Communication Technology (ICICT-2018), 2018, pp. 1209-1216, Elsevier.

Black, et al., "Differentiated Services (Diffserv) and Real-Time Communication", Internet Engineering Task Force, Request for Comments 7657, Nov. 2015, 26 pages, IETF Trust.

"Cisco Application Policy Infrastructure Controller Enterprise Module—Release 1.5", Data Sheet, Jun. 2017, 4 pages, Cisco Systems, Inc.

Szigeti, et al., "Cisco Digital Network Architecture: Intent-based Networking for the Enterprise", Chapters 20 and 21, Jan. 2019, pp. 569-710, CiscoPress.com.

* cited by examiner

COMPONENT TAGS

- ☐ Components without tags
- ☐ ▼ Device - Level 0-1
  - ☐ IO Module (3)
  - ☐ Wireless IO Module (2)
- ☐ ▼ Device - Level 2
  - ☐ Citect Alarm Server
  - ☐ Citect IO Server
  - ☐ Citect Report Server
  - ☐ Citect Trend Server
  - ☐ Engineering Station (3)
  - ☐ Master
  - ☐ PLC (9)
  - ☐ SCADA Station (3)
  - ☐ Slave
  - ☐ Train
- ☐ ▼ Device - Level 3-4
  - ☐ Admin Server (1)
  - ☐ DNS Server (2)
  - ☐ Database Server
  - ☐ Email Server
  - ☐ File Transfer Server
  - ☐ HTTP Client
  - ☐ Historian
  - ☐ Host Config Server (3)
  - ☐ Key Management Server
  - ☐ License Management Server
  - ☐ Log Server
- ☐ ▼ Network analysis
  - ☐ Port Scan
  - ☐ Port Scan Target
  - ☐ Public IP (19)
- ☐ ▼ Software
  - ☐ Active Directory
  - ☐ CodeSys
  - ☐ DFS
  - ☐ Lotus notes
  - ☐ Microsoft Exchange
  - ☐ NSIS
  - ☐ NetLogon
  - ☐ PI Osisoft
  - ☐ WINS
  - ☐ WMI
  - ☐ WinRM
  - ☐ Windows (10)
  - ☐ Windows Audio
  - ☐ Windows CSP
  - ☐ Windows Connection Manager
  - ☐ Windows DTCPing
  - ☐ Windows File Protection
  - ☐ Windows Messenger Service
  - ☐ Windows Network DDE
  - ☐ Windows Plug and Play
  - ☐ Windows SCM
  - ☐ Windows SecondaryLogon
  - ☐ Windows Task Scheduler
  - ☐ Windows WebClient

ACTIVITY TAGS
- ☐ Activities without tags
- ☐ ▼ Control system behavior
  - ☐ Block Download
  - ☐ Control action (1)
  - ☐ Controller Info
  - ☐ Controller Name
  - ☐ Data Push
  - ☐ Device Init (1)
  - ☐ Diagnostics
  - ☐ Emergency Brake
  - ☐ Firmware Download
  - ☐ Firmware Update
  - ☐ Force Variable
  - ☐ Heartbeat
  - ☐ Hot Reboot
  - ☐ Insert Program
  - ☐ Installed Modules
  - ☐ Memory Formatting
  - ☐ Network Configuration
  - ☐ Operational Change
  - ☐ PLC Clock
  - ☐ PLC Reservation
  - ☐ Password Change
  - ☐ Program Download (4)
  - ☐ Program Upload (2)
  - ☐ Programming CPU

- ☐ ▼ IT behavior
  - ☐ Active Directory Replication
  - ☐ Admin (1)
  - ☐ Antivirus
  - ☐ Authentication (1)
  - ☐ Database
  - ☐ Email
  - ☐ Host Config (11)
  - ☐ IT File Sync
  - ☐ IT File Transfer
  - ☐ Key management
  - ☐ License Management
  - ☐ Log
  - ☐ Net Management (3)
  - ☐ Net Routing
  - ☐ Ping (10)
  - ☐ Power Management
  - ☐ Printer Management
  - ☐ Procedure Call
  - ☐ Proxy
  - ☐ Remote access (1)
  - ☐ Streaming
  - ☐ Time Management (9)
  - ☐ VPN
  - ☐ Web (3)
  - ☐ Windows DFS Replication
  - ☐ Windows Discovery
- ☐ ▼ Network analysis
  - ☐ Authentication Error
  - ☐ Broadcast (81)

FIG. 4B

Component

Yokogawa 192.168.11...
IP: 192.168.119.131
MAC: 00:00:64:98:b7:6b

First activity
Sep 24, 2019 4:34:12 PM

Last activity
Sep 25, 2019 10:10:09 AM

Tags: ⬦ Engineering Station, ⬦ PLC, ⬦ CodeSys, ⬦ Lotus notes, ⬦ PI Osisoft

Activity tags: ⬦ Heartbeat, ⬦ Read Var, ⬦ Citect Alarm, ⬦ Citect IO, ⬦ Citect Report, ⬦ Citect Trend, ⬦ SCADA Station, ⬦ Authentication, ⬦ Database, ⬦ Net Management ...22+

Properties: vendor-name: Yokogawa Digital Computer Corporation
name: Yokogawa 192.168.119.131
ip: 192.168.119.131
public-ip: no
mac: 00:00:64:98:b7:6b

DYNAMIC INTENT-BASED QOS POLICIES FOR COMMANDS WITHIN INDUSTRIAL PROTOCOLS

TECHNICAL FIELD

The present disclosure relates generally to computer networks, and, more particularly, to dynamic, intent-based quality of service (QoS) policies for commands within industrial protocols.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

The nature of the IoT often means that bandwidth and other network resources are relatively constrained. This means that quality of service (QoS) decisions made with respect to different types of traffic may actually impinge on the operation of the network. For instance, if all traffic of a certain type is sent at a high priority, this may needlessly consume network resources that could otherwise be devoted to other traffic in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a service identifies a packet sent by a first device in a network to a second device as being of a particular protocol. The service identifies a control command within the packet for the second device, based in part on the particular protocol identified for the packet. The service determines, based on the control command within the packet, a quality of service policy for the packet. The service causes the quality of service policy to be applied to the packet along a path in the network via which the packet is sent from the first device to the second device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
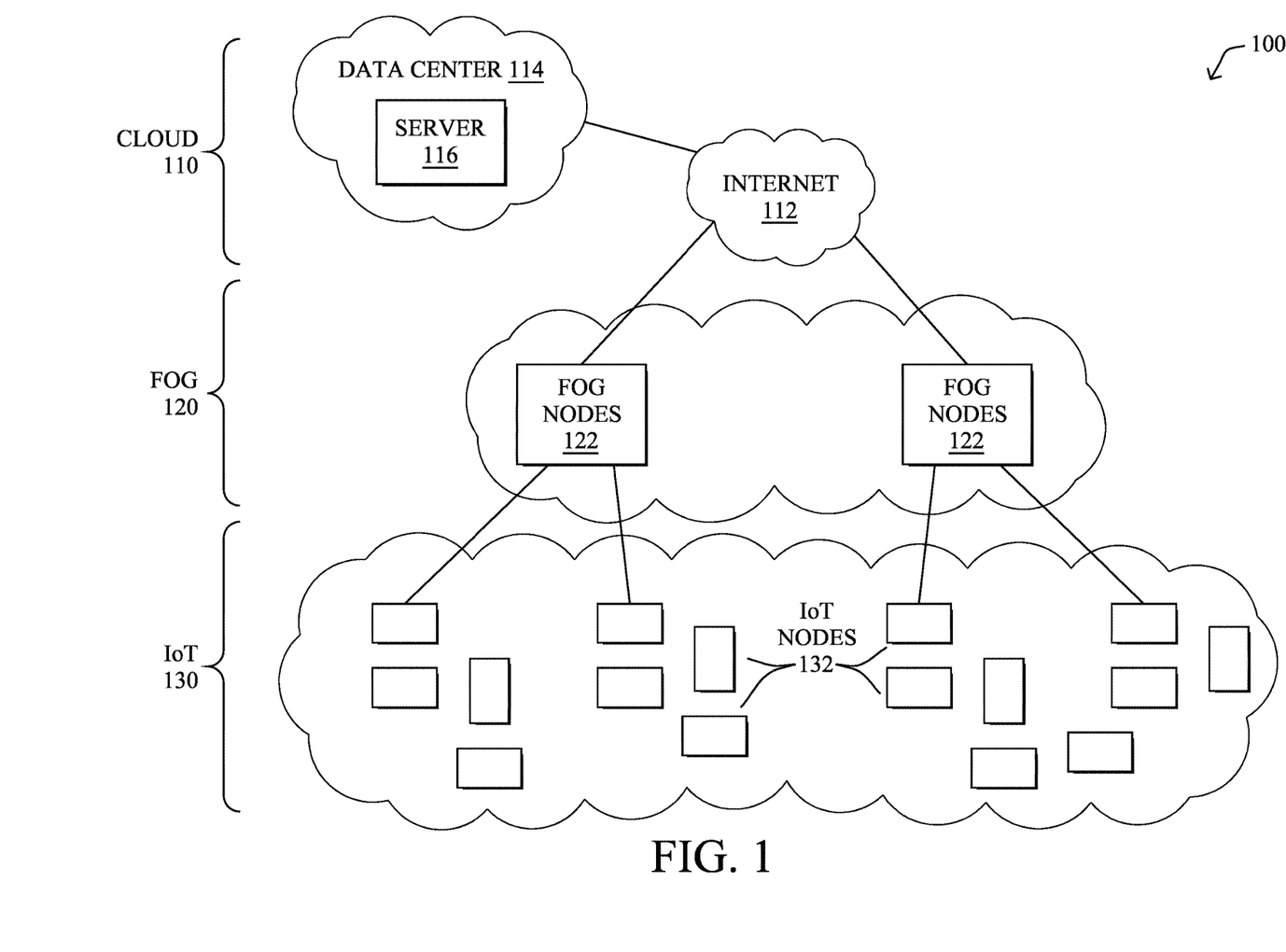
FIG. 1 illustrate an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
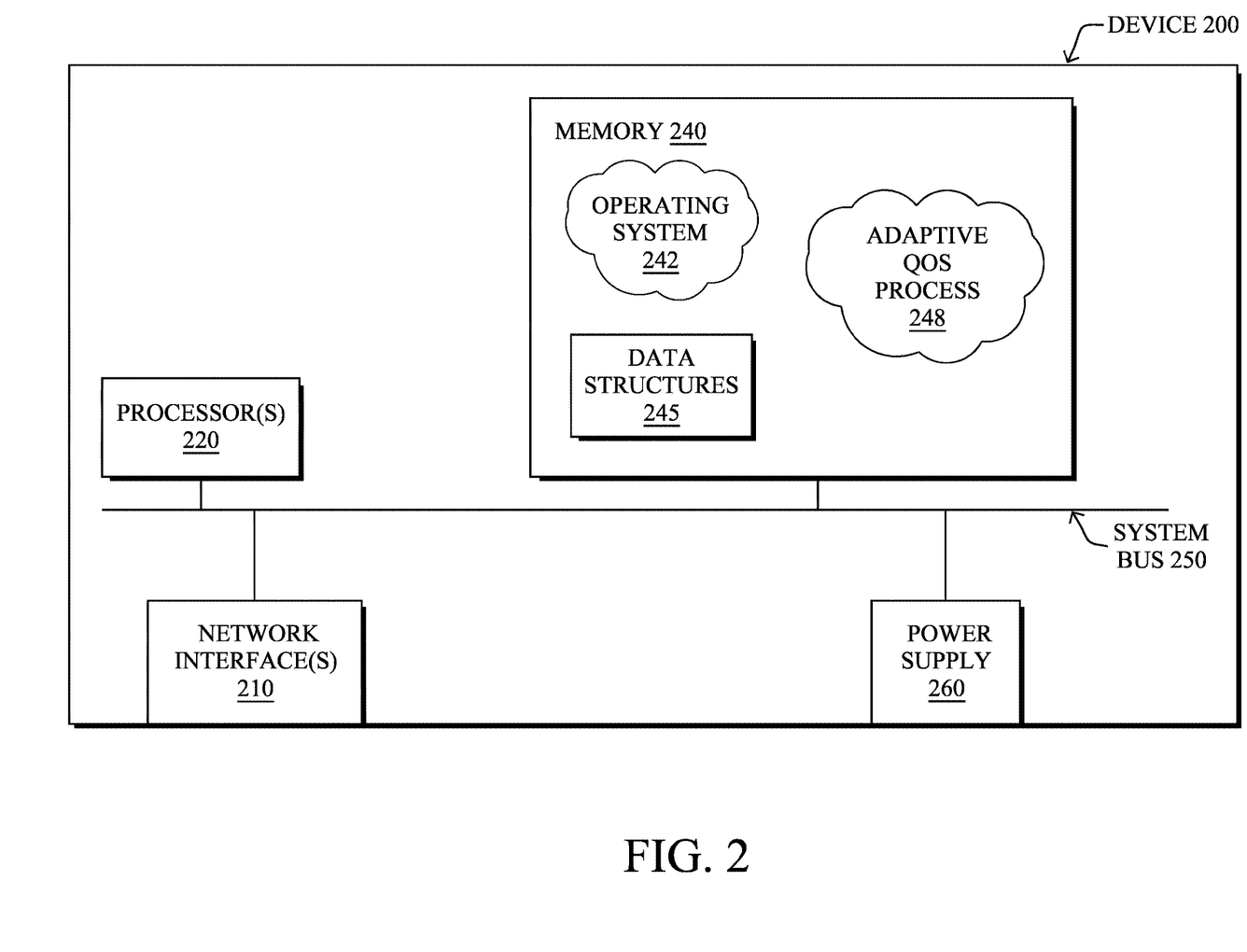
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for powerline communications the network interface 210 may communicate through the power supply 260, or may be an integral component of the power supply. In some specific configurations the powerline communication signal may be coupled to the power line feeding into the power supply.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an adaptive quality of service (QoS) process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, adaptive QoS process 248 may be configured to perform any or all of the following tasks:
1. Identifying and classifying devices in the network— this may entail, for example, determining the make, model, software configuration, type, etc. of a given device.
2. Discerning operational insights about a device—for example, as detailed below, adaptive QoS process 248 may assess the traffic of a particular device, to determine what the device is doing, or attempting to do, via the network. Such information may take the form of device details and communication maps for the device. In further cases, the device functions and application flows may be converted into tags and/or events for presentation to a user interface. Further, process 248 may also track variable changes, to monitor the integrity of the industrial workflow.
3. Implementing QoS Policies—adaptive QoS process 248 may also function to assign QoS policies to different packets and/or traffic flows within a network. Such policies may, for instance, control how the packets and/or traffic are prioritized, routed, or the like.

In various embodiments, adaptive QoS process 248 may employ any number of machine learning techniques, to assess the gathered telemetry data regarding the traffic of the device. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, adaptive QoS process 248 can use the model M to classify new data points, such as information regarding new traffic flows in the network. Often, M is a statistical model, and the cost function is inversely proportional to the likelihood of M, given the input data.

In various embodiments, adaptive QoS process 248 may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that adaptive QoS process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

In some cases, adaptive QoS process 248 may assess the captured telemetry data on a per-flow or per-packet basis. In other embodiments, adaptive QoS process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

From a security standpoint, the very nature of the IoT presents certain challenges. Indeed, the diversity of the various devices in the network in terms of their hardware, software, and purposes (e.g., sensing, controlling, etc.), as well as the specific configuration of the network (e.g., cells in an industrial network, etc.), can make enforcing network security particularly challenging.

Best practices for Industrial IoT security typically follow standardized models, such as IEC 62443. This security model implements both operational technology (OT) and information technology (IT) security levels and establishes how security should be designed in industrial systems.

Furthermore, it describes how security between levels is accomplished through the use of controlled conduits. However, industrial security remains very difficult to enforce, as evidenced by recent industrial attacks where this model was in place. A superior approach would be to leverage intent-based networking, complete with abstraction, automation and analytics, to define, enforce and assure IoT security policies.

It is also important to recognize that IoT devices typically follow a very well prescribed communication profile (e.g., to which devices they should be communicating, on what protocol, and what the protocol should be doing). For instance, a supervisory 1o control and data acquisition (SCADA) slave should only ever communicate to a SCADA master on an established port and should only execute allowable commands. However, it remains very difficult to both 1.) verify that the things, such as intelligent electronic devices, programmable logic controllers (PLCs), variable-frequency drive (VFD), human-machine interfaces (HMIs), input/output (I/O) controllers, etc., are communicating in the expected way and 2.) control their behaviors such that any unexpected network attacks are isolated.

Even when the communications between endpoints are seemingly innocuous, there has been a recent trend in malware taking advantage of these communications to damage equipment. In these forms of attacks, an infected endpoint can send control commands to another endpoint, with whom communication is allowed, that can damage or disrupt the operations of the equipment and, potentially, the industrial environment as a whole. For example, malicious SCADA commands to a PLC could cause the PLC to drive a motor in an unsafe way, cause power to be turned off or on to a circuit (e.g., a feeder in an electrical power station), or the like.

Figure 3:
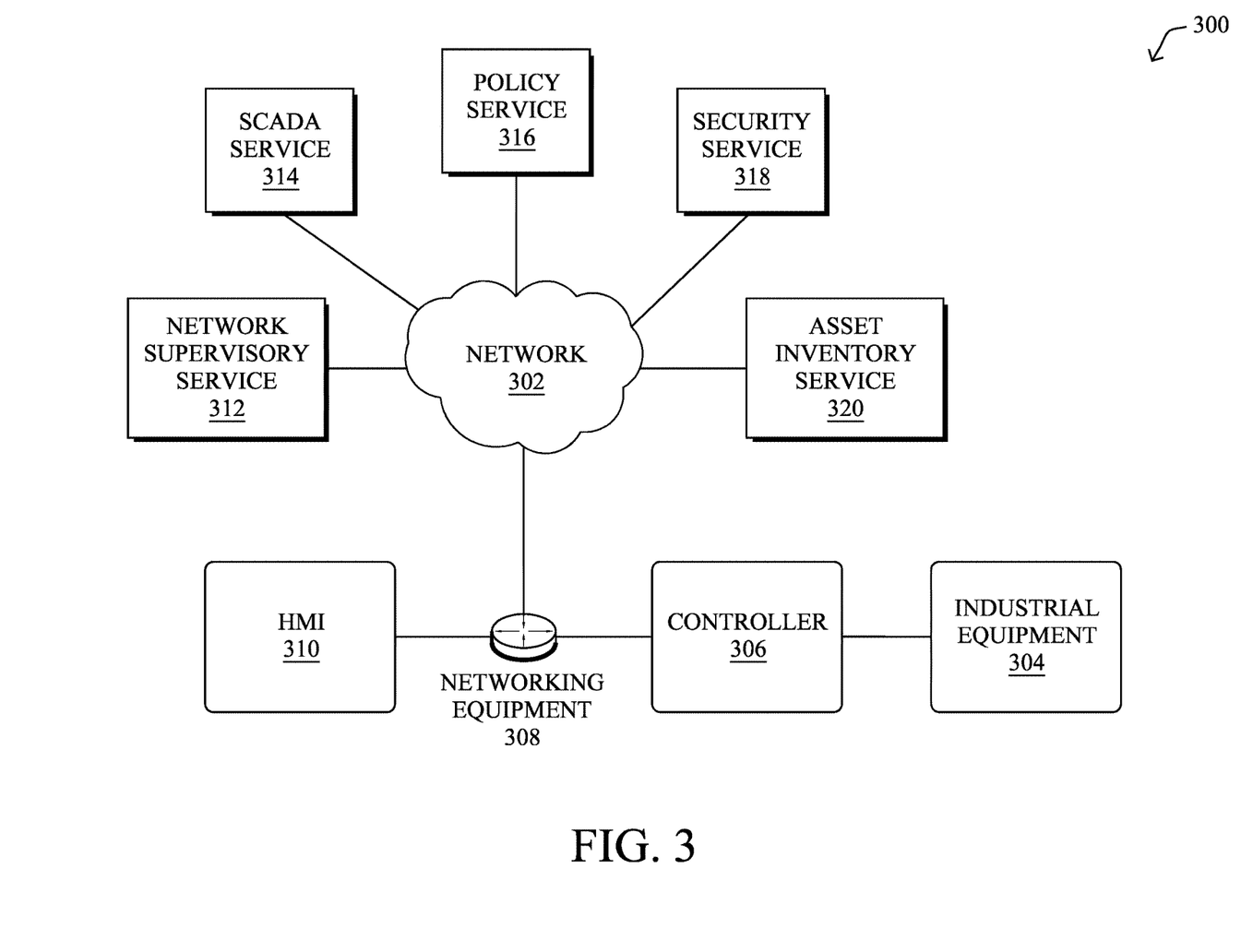
FIG. 3 illustrates an example network architecture for an industrial network.

FIG. 3 illustrates an example network architecture 300 for an industrial network, according to various embodiments. As shown, architecture 300 may include industrial equipment 304 connected to a controller 306, such as a PLC, a VFD, or the like, that controls the operations of industrial equipment 304. In turn, controller 306 for industrial equipment 304 may be connected to an HMI 310 via networking equipment 308, allowing a human user to interface with it (e.g., to visualize the industrial process, issue commands, etc.). In addition, networking equipment 308 may also provide connectivity via the greater network 302 to any number of network services 312-320 provided in the local network of networking equipment 308 and/or remotely. For example, services 312-320 may be implemented in the local network via dedicated equipment or virtualized across any number of devices (e.g., networking equipment 308). In other cases, services 312-320 may be provided by servers in a remote data center, the cloud, or the like. While services 312-320 are shown as distinct services, it should be appreciated that they may operate in conjunction with one another to provide a unified service to the network.

As would be appreciated, industrial equipment 304 may differ, depending on the industrial setting in which architecture 300 is implemented. In many cases, industrial equipment 304 may comprise an actuator such as, but not limited to, a motor, a pump, a solenoid, or the like. In other cases, industrial equipment 304 may include a circuit and controller 306 may control the powering of the circuit.

Industrial equipment 304 may also include any number of sensors configured to take measurements regarding the physical process implemented by industrial equipment 304. For example, such sensors may take temperature readings, distance measurements, humidity readings, voltage or amperage measurements, or the like, and provide them to controller 306 for industrial equipment 304. During operation, controller 306 may use the sensor data from industrial equipment 304 as part of a control loop, thereby allowing controller 306 to adjust the industrial process as needed.

HMI 310 may include a dedicated touch screen display or may take the form of a workstation, portable tablet or other handheld, or the like. Thus, during operation, visualization data may be provided to HMI 310 regarding the industrial process performed by industrial equipment 304. For example, such visualizations may include a graphical representation of the industrial process (e.g., the filling of a tank, etc.), the sensor data from industrial equipment 304, the control parameter values used by controller 306, or the like. In some embodiments, HMI 310 may also allow for the reconfiguration of controller 306, such as by adjusting its control parameters for industrial equipment 304 (e.g., to shut down the industrial process, etc.).

Networking equipment 308 may include any number of switches, routers, firewalls, telemetry exporters and/or collectors, gateways, bridges, and the like. In some embodiments, these networking functions may be performed in a virtualized/containerized manner. For example, a telemetry exporter may take the form of a containerized application installed to networking equipment 308, to collect and export telemetry regarding the operation of networking equipment 308 (e.g., queue state information, memory or processor resource utilization, etc.) and/or network 302 (e.g., measured delays, drops, jitter, etc.).

In some embodiments, at least a portion of network 302 may be implemented as a software-defined network (SDN). In such implementations, control plane decisions by the networking equipment of network 302, such as networking equipment 308, may be centralized with an SDN controller. For example, rather than networking equipment 308 establishing routing paths and making other control decisions, individually, such decisions can be centralized with an SDN controller (e.g., network supervisory service 312, etc.).

During operation, network supervisory service 312 may function to monitor the status and health of network 302 and networking equipment 308. An example of such a network supervisory service is DNA-Center by Cisco Systems, Inc. For example, in some implementations, network supervisory service 312 may take the form of a network assurance service that assesses the health of network 302 and networking equipment 308 through the use of heuristics, rules, and/or machine learning models. In some cases, this monitoring can also be predictive in nature, allowing network supervisory service 312 to predict failures and other network conditions before they actually occur. In either case, network supervisory service 312 may also provide control over network 302, such as by reconfiguring networking equipment 308, adjusting routing in network 302, and the like. As noted above, network supervisory service 312 may also function as an SDN controller for networking equipment 308, in some embodiments.

As shown, architecture 300 may also include SCADA service 314 which supervises the operation of the industrial process. More specifically, SCADA service 314 may communicate with controller 306, to receive data regarding the industrial process (e.g., sensor data from industrial equipment 304, etc.) and provide control over controller 306, such as by pushing new control routines, software updates, and the like, to controller 306.

As would be appreciated, SCADA service 314, controller 306, and/or HMI 310 may communicate using an automation protocol. Examples of such protocols may include, but are not limited to, Profibus, Modbus, DeviceNet, HART, DNP3, IEC 61850, IEC 60870-5, and the like. In addition, different protocols may be used within network 102 and among networking equipment 308, depending on the specific implementation of architecture 300. Further, different portions of network 302 may be organized into different cells or other segmented areas that are distinct from one another and interlinked via networking equipment 308.

Architecture 300 may also include a policy service 316 that is responsible for creating and managing security and access policies for endpoints in network 302. An example of such a policy service 316 is the Identity Services Engine (ISE) by Cisco Systems, Inc. In various embodiments, as detailed below, policy service 316 may also be configured to identify the types of endpoints present in network 302 (e.g., HMI 310, controller 306, etc.) and their corresponding actions/functions. In turn, this information can be used to drive the policies that policy service 316 creates.

Security service 318 is configured to enforce the various policies created and curated by policy service 316 in the network. For example, such policies may be implemented by security service 318 as access control lists (ACLs), firewall rules, or the like, that are distributed to networking equipment 308 for enforcement.

According to various embodiments, architecture 300 may also include asset inventory service 320 that is used to collect information about learned assets/endpoints in network 302 and maintain an inventory of these various devices in network 302. In various embodiments, asset inventory service 320 may do so by embedding sensing modules in networking equipment 308 which passively analyze communications between endpoints. The sensors may use deep packet inspection (DPI) to not only identify the protocols in use by a given packet (e.g., the automation protocol used between HMI 310, controller 306, and SCADA service 314), but also understand the action(s) that are being communicated and to classify both the type of device/component and its application behavior.

For example, when a sensor module executed by networking equipment 308 identifies the use of an automation protocol by a packet, it may examine the payload of each flow to identify any or all of the following:

The device type (e.g., based on passive scan of traffic and matching a known criterion, the device is classified).
The software and/or hardware versions of the device.
MAC and IP addresses of all devices with which the discovered device is communicating.
The activity profile of the device (e.g., how is it trying to communicate), and the protocol(s) it is using.
The commands that are being passed (e.g., SCADA commands, etc.), down to the specific control parameter values.

The sensor modules of networking equipment 308 then then organize the collected information into meaningful tags. In general, these tags are simply a way to categorize devices and their behaviors, similar to the same way a human may look at a pen or a pencil and categorize them as writing instruments. Each device can also have multiple tags associated with it, such as the following:

Component Tags—these tags identify device specific details (e.g. Device ID. SCADA station, PLC. Windows device, etc.).
Activity Tags—these tags identify what the device is doing at the protocol level (Programming CPU. Heartbeat, Emergency Break, Data Push).
User-Defined Tags—these could be custom tags to supply additional context (e.g. "Cell 1 Tag").
Dynamically Generated Tags—these could be added dynamically (e.g., using ML) to signify whether the behavior of the device is normal or anomalous, or for other dynamic conditions.
Scalable Group Tags—These tags are applied to specific packet flows between a defined group of devices/services in the network. For example, in the case shown. HMI 310, controller 306, and SCADA service 314 may be tagged as belonging to a particular group.

The sensor modules embedded in networking equipment 308 may also collect metadata about the communicating devices/endpoints, including its network identifiers (e.g. IP and MAC addresses), vendor, device-type, firmware version, the switch ID and port where the device is connected, etc. As the sensor module learns details of a new device/endpoint in network 302, it may send its collected metadata about that device, along with its tags, to the asset inventory service 320.

In this manner, asset inventory service 320 may maintain an inventory of each of the endpoint devices in network 302, their associated tags, and their metadata. Thus, as new devices are discovered in network 302, their profile information is added to the live inventory of devices maintained by asset inventory service 320. As noted above, the various tags applied by the sensor modules deployed to networking equipment 308 and used by asset inventory service 320 may be predefined or may, via a user interface (not show) be user-defined.

Figure 4A:
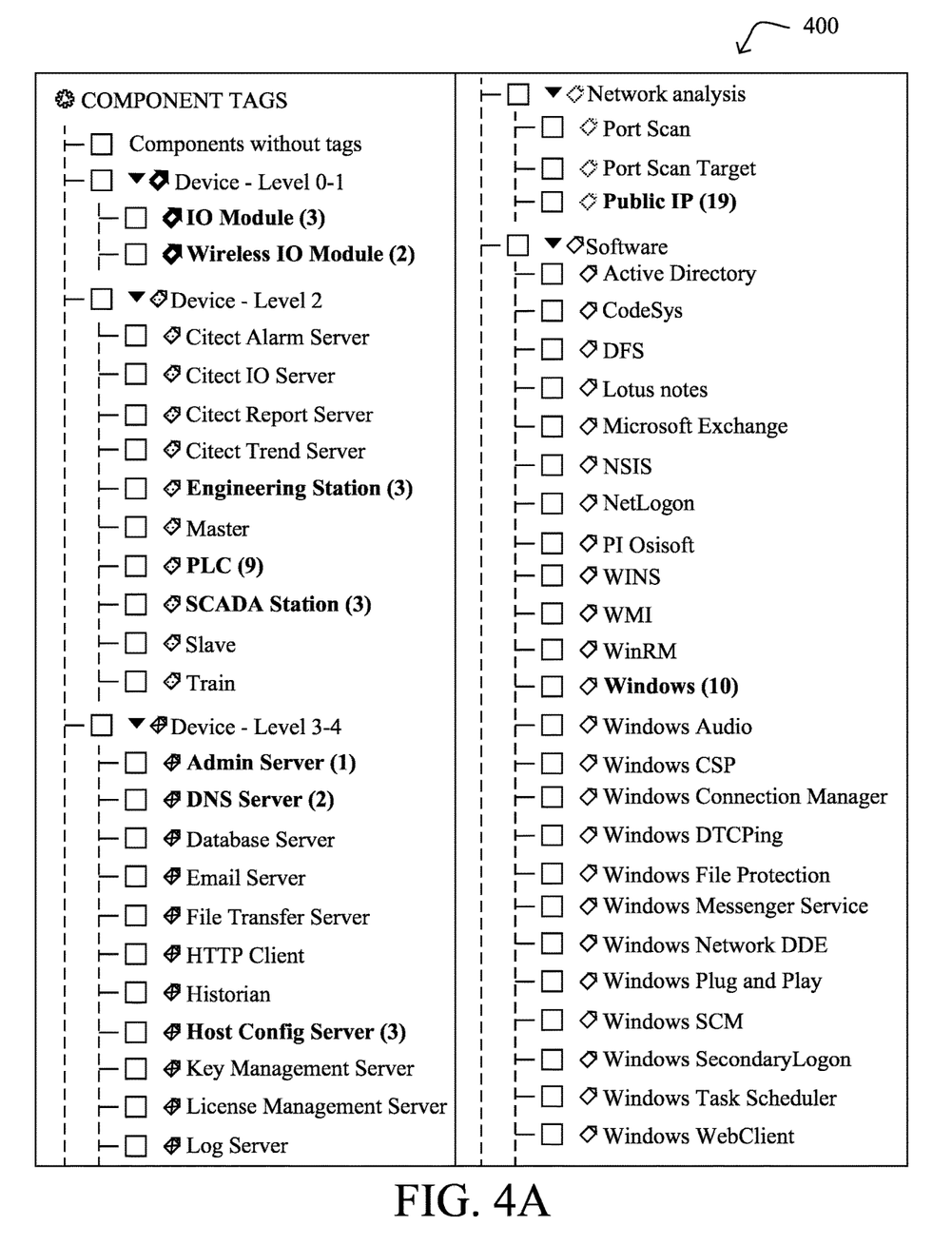
FIGS. 4A-4B illustrate example displays of component and activity tags.
Figure 4B:
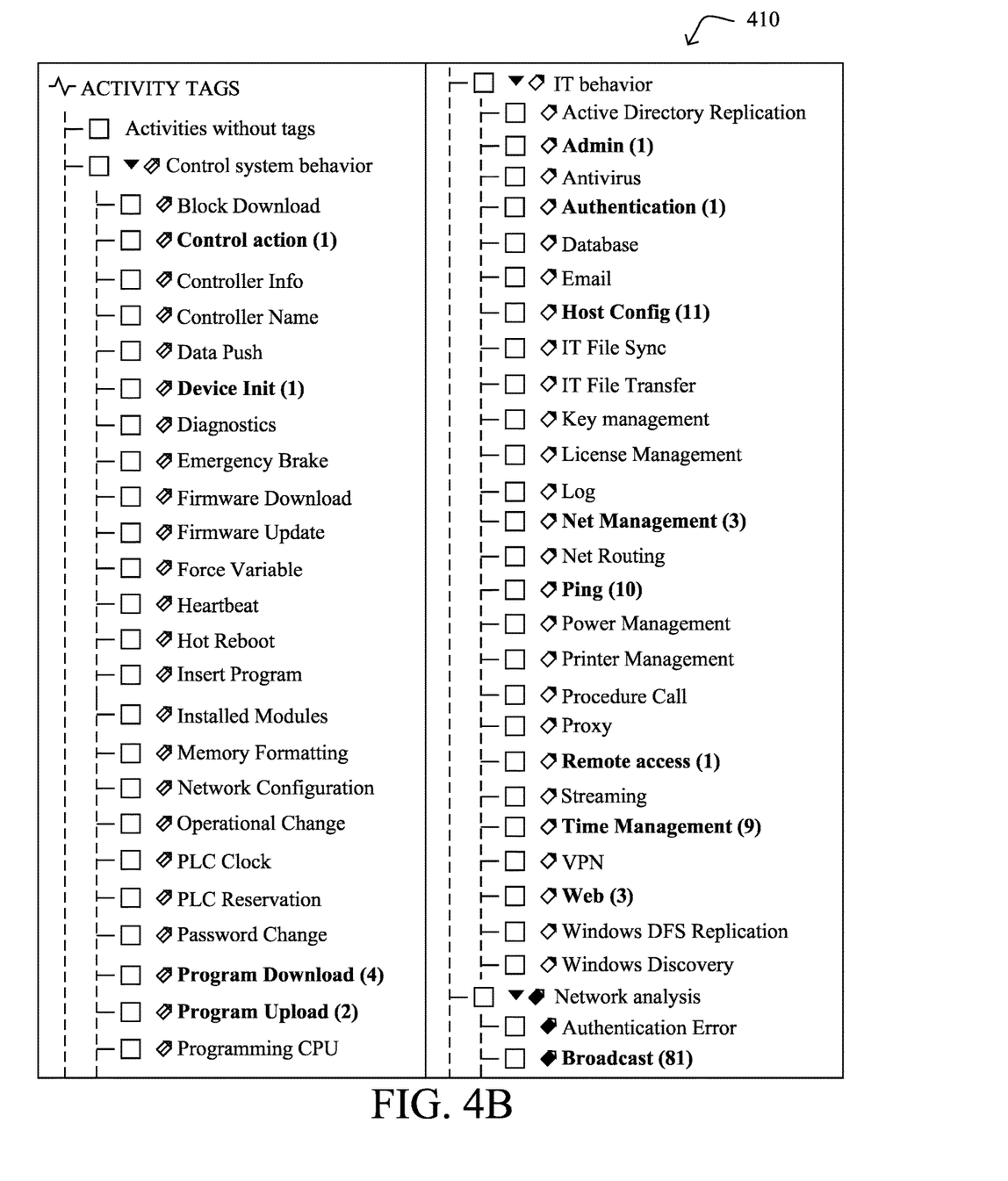

FIGS. 4A-4B illustrate example displays 400, 410, respectively, showing component and activity tags, in some embodiments. As shown, the various component tags can be used to identify a particular endpoint or other device in the network by its type (e.g., PLC, SCADA station, etc.), its software (e.g., CodeSys, Windows, etc.). In addition, analysis of the traffic of the device can also lead to various activity tags being applied to that device, as well. For example, such activity tags may distinguish between control system behaviors (e.g., insert program, device init., etc.) and IT behaviors (e.g., host config., ping, etc.).

Referring again to FIG. 3, to facilitate the labeling of devices in network 302 using tags, asset inventory service 320 may also leverage device classification functions provided by policy service 316, to identify the component and activity tags of a particular device in network 302 under scrutiny. In general, device classification (also known as "device profiling") has traditionally used static rules and heuristics for the determination. In further embodiments, the device classification by policy service 316 can be achieved by applying a trained machine learning-based classifier to the captured telemetry data from networking equipment 308. Such telemetry data can also take the form of information captured through active and/or passive probing of the device. Notably, this probing may entail policy service 316 sending any or all of the following probes via networking equipment 308:

Dynamic Host Configuration Protocol (DHCP) probes with helper addresses
SPAN probes, to get messages in INIT-REBOOT and SELECTING states, use of ARP cache for IP/MAC binding, etc.
Netflow probes
HyperText Transfer Protocol (HTTP) probes to obtain information such as the operating system (OS) of the device, Web browser information, etc.
Remote Authentication Dial-In User Service (RADIUS) probes.

Simple Network Management Protocol (SNMP) to retrieve Management Information Base (MIB) object or receives traps.

Domain Name System (DNS) probes to get the Fully Qualified Domain Name (FQDN)

etc.

Further information that may be captured by networking equipment 308 and reported via telemetry data to policy service 316 may include traffic behavioral characteristics of the traffic of a device, such as the communication protocols used, flow information, timing and pattern data, and the like. In addition, the telemetry data may be indicative of the operational intent of the endpoint device (e.g., controller 306, HMI 310, etc.).

According to various embodiments, additional information that policy service 316 and asset inventory service 320 may use to tag the various devices/components in 1o network 302 may include any or all of the following:

Manufacturer's Usage Description (MUD) information— As proposed in the Internet Engineering Task Force (IETF) draft entitled, "Manufacturer Usage Description Specification," devices may be configured by their manufacturers to advertise their device specifications. Such information may also indicate the intended communication patterns of the devices.

Asset Administration Shell data—this is an Industry 4.0 method to express how an IoT device should behave, including expected communication patterns.

IEC 61850 Substation Configuration Language (SCL) data—this is a language that is used primarily in the utility industry to express Intelligent Electronic Device (IED) intent.

Open Platform Communication Unified Architecture (OPC UA) data—such data provides industrial models used in manufacturing contexts.

Thus, policy service 316, asset inventory service 320, and the sensor modules and telemetry exporters of networking equipment 308 may operate in conjunction with one another to apply various tags to the devices in network 302 and their traffic flows.

Figure 5:
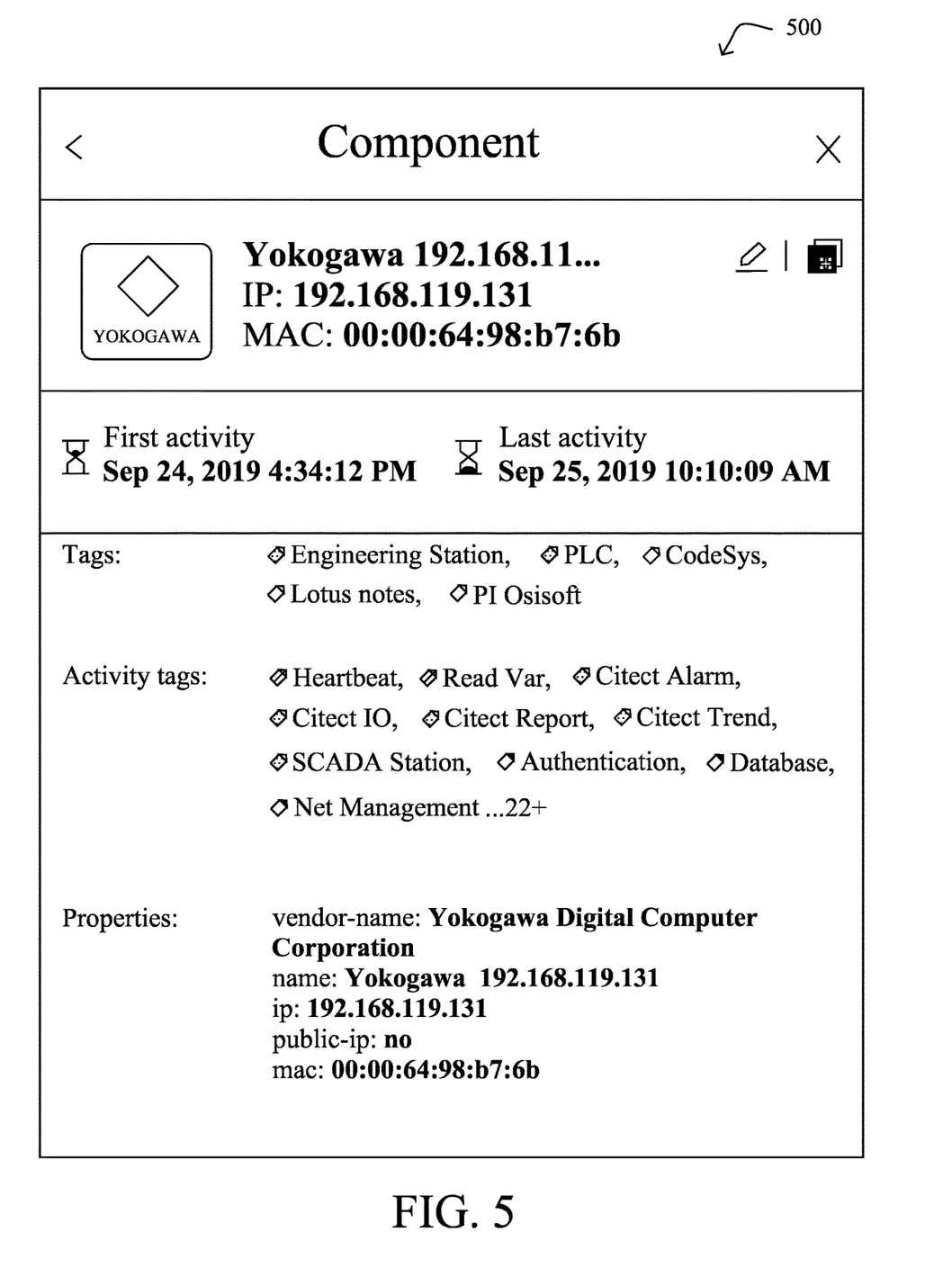
FIG. 5 illustrates an example an asset profile.

FIG. 5 illustrates an example of an asset profile 500, in some embodiments. Notably, the techniques herein have been implemented as part of a prototype system and asset profile 500 depicts an actual screen from that prototype system. As can be seen, a particular asset has been identified as a Yokogawa device and has been tagged with various component and activity tags (e.g., PLC, CodeSys, Citect Report, etc.). This profile may be stored by the asset inventory service (e.g., service 320 in FIG. 3) and provide to a user interface, allowing the user to quickly learn information about the device. Such information can also be automatically updated over time, using the techniques herein.

As noted above, there are many industrial protocols in IoT environments that require strict service level agreements (SLAs), such as control commands sent to robots 1o or other machinery. Conversely, there are other industrial protocols that are largely time-insensitive, but contain vital information (e.g., meter readings). As such, both sets of protocols would benefit from quality of service (QoS) policies in the network, whether these policies are set to prioritize traffic or to deprioritize traffic, depending on their natures. This is an escalating concern in IoT networks, as bandwidth resources are often very limited in these environments. For example, in some field or remote/mobile networks traffic is often sent over cellular links, which are typically slow compared to other forms of links. Even in industrial Ethernet environments, many IoT switches support only (100 Mbps) Fast Ethernet speeds, such as in the case of a typical electrical substation.

A key observation herein is that network traffic for commonly deployed protocols often vary in their SLA requirements, depending on the specific nature of the operation currently being performed. For example, the Profinet protocol can be used to send urgent commands to IoT devices, such as "START," "STOP," "READ," "TAKE ACTION X," etc. However, at other times, Profinet traffic may be used to send non-urgent data to devices, such as a program to be loaded. Thus, if all Profinet traffic were treated with a uniform QoS/level of priority, this could cause operational issues. Indeed, treating all such traffic with a high priority may lead to the non-urgent traffic consuming resources that may be devoted to other traffic in the network.

Today, applications typically mark their QoS priority level into the Differentiated Services Code Point (DSCP) field of an IP packet. This DSCP field is placed by the application when opening a network socket call. Note that the operating system of the sending device may validate whether the application is entitled to this QoS marking, but operates in a strict allow/override logic, without any view on what type of message the application is transmitting. The result is that for automation systems, all packets transmitted by the IoT device application use the same DSCP marking, regardless of the actual priority of the message within the packet.

The above is an especially relevant consideration when dealing with large file transfers due to the very nature of the Transfer Control Protocol (TCP), which continually expands its TCP segment window size until it hits the maximum size that the transmission media will support. In other words, if long TCP flows are prioritized over a network, then these drown out other flows on the same network. On the other hand, if an industrial automation protocol, such as Profinet, were always to be treated with a 'low' priority, then this would adversely impact the performance of commands that are central to the automation system. As such, these kinds of industrial protocols would greatly benefit by having the network understand the specific operations being performed and dynamically adapting to these.

—Dynamic Intent-Based QoS Policies for Commands within Industrial Protocols—

The techniques herein introduce a mechanism to apply intent-based QoS treatment for industrial devices that also take into account the specific commands or other actions taken within the protocols in use. In some aspects, deep packet inspection (DPI) or other packet analysis approach can be used to examine the protocols and commands in use, so as to apply an appropriate QoS policy to that traffic.

Illustratively, the techniques described herein may be performed by hardware, software, and/or firmware, such as in accordance with the adaptive QoS process 248, which may include computer executable instructions executed by the processor 220 (or independent processor of interfaces 210) to perform functions relating to the techniques described herein.

Specifically, according to various embodiments, a service identifies a packet sent by a first device in a network to a second device as being of a particular protocol. The service identifies a control command within the packet for the second device, based in part on the particular protocol identified for the packet. The service determines, based on the control command within the packet, a quality of service policy for the packet. The service causes the quality of service policy to be applied to the packet along a path in the network via which the packet is sent from the first device to the second device.

Operationally, and referring again to FIG. 3, metadata about an IoT device is collected by hardware or (preferably) software sensors (e.g., networking equipment 308), such as the IP and MAC addresses, vendor, device-type, firmware version, the switch ID and port where the device is connected, etc. As the sensor learns details of a new device, these details may be sent as metadata about each device, and are associated with abstract tags in asset inventory service 320. The tags may generally be grouped into asset tags, which describe the device, and activity tags, which describe what that device is doing on the network. Asset inventory service 320 examines all the metadata information and tags of the new device being added. These tags can then be used to classify and describe the device and its traffic.

According to various embodiments, the tagging mechanisms within FIG. 3 may be extended to further tag assets and their packets in asset inventory service 320 with: 1.) the protocol(s) that they use and 2.) the specific commands or other forms of data that they convey. More specifically, the sensor(s) in networking equipment 308 may perform DPI or other packet analysis on the packets in the network, to identify their protocol(s) and message contents. This allows corresponding tags to be added via asset inventory service 320.

Figure 6:
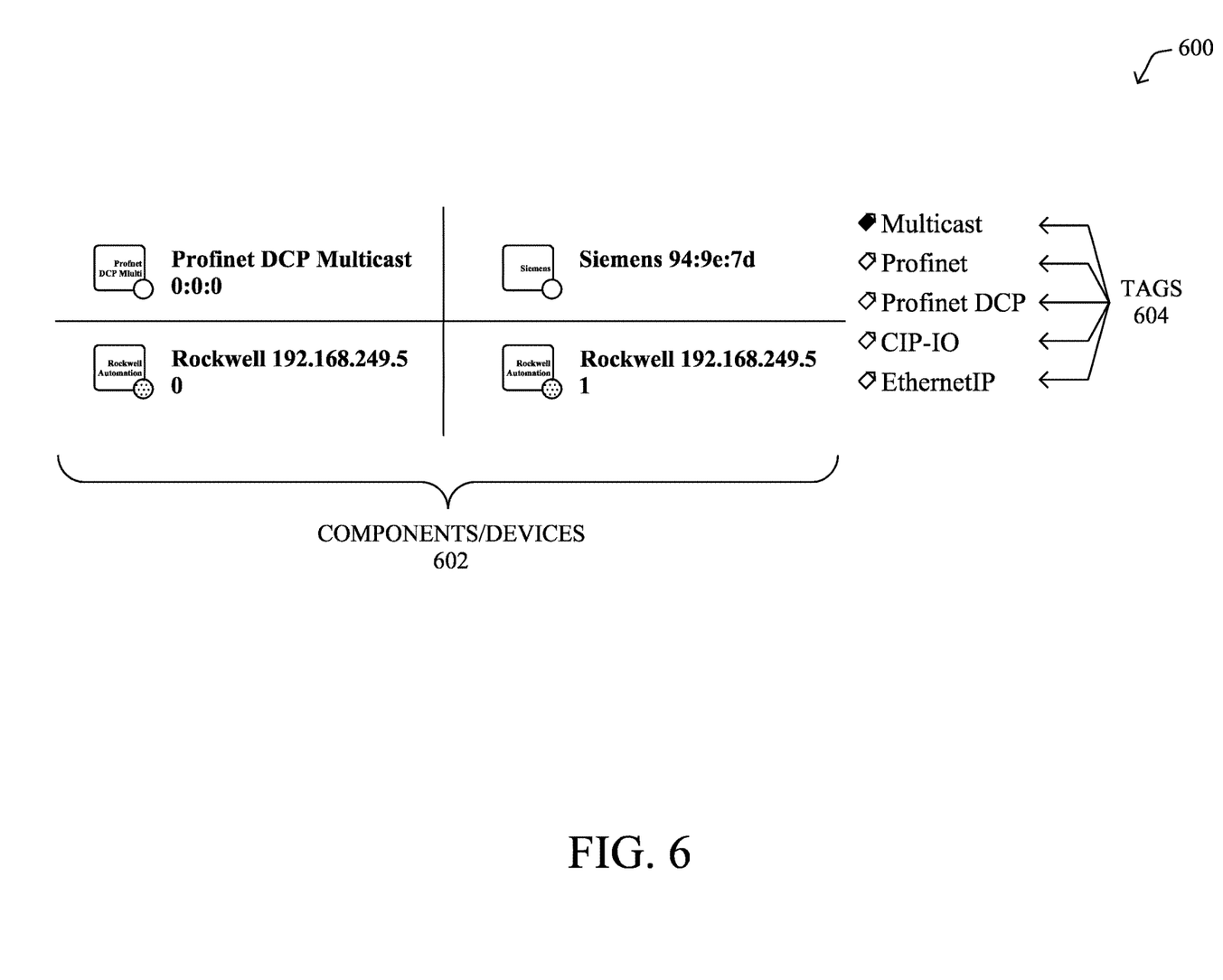
FIG. 6 illustrates an example of protocol tags being associated with devices.

FIG. 6 illustrates an example 600 of a set of components/devices 602 and a selection of their associated tags 604 that may be maintained by asset inventory service 320 through inspection of their packets, in various embodiments. As shown, tags 604 may indicate the types of traffic sent by components/devices 602, such as unicast, multicast, or broadcast traffic. In addition, tags 604 may indicate the various protocols that components/devices 602 employ. For instance, tags 604 may indicate that the set of components/devices 602 communicate using Profinet. Profinet Discovery and Configuration Protocol (DCP), Common industrial Protocol (CIP), and/or Ethernet IP. Other example industrial automation protocols that may be identified via network sensors may include, but are not limited to, Modbus, CAN bus, ControlNet, HART protocol, Factory Instrumentation Protocol, and other suitable automation protocols.

While the techniques herein are described primarily with respect to automation protocols, there are also other non-industrial protocols that can also be used to convey different types of traffic. For instance, HTTP/HTTPS can also be used to transport audio, video, webpage data, large files, and the like. Accordingly, the techniques herein can also be applied to these and other types of protocols, as well as to industrial automation protocols.

Figure 7:
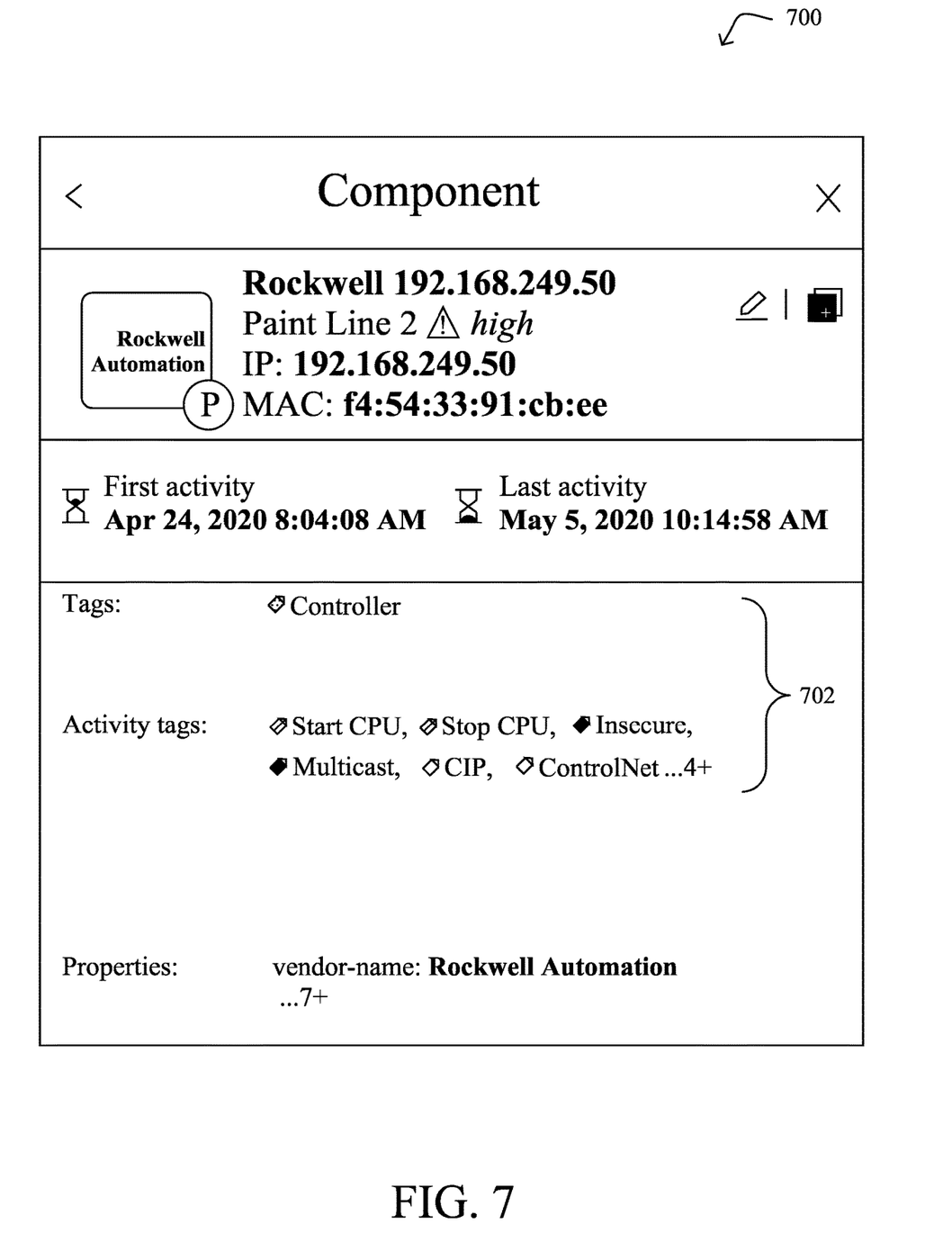
FIG. 7 illustrates an example asset profile indicating protocol and command tags.

FIG. 7 illustrates an example an asset profile 700 enhanced with protocol and command information, according to various embodiments. As shown, asset profile 700 may include tags 702 that indicate that the particular device is a controller, sends multicast traffic, uses protocols such as CIP and ControlNet, and issues commands such as "Start CPU," and "Stop CPU."

Referring again to FIG. 3, asset inventory service 320 may provide a graphical user interface (GUI) that allows a user to select a particular tag and specify QoS preferences for traffic having that tag. For instance, the user may select from among options "Prioritize Protocol," "Treat Protocol with a Default Service," or "Deprioritize Protocol," for a particular protocol's tag. In other words, asset inventory service 320 may be configured to solicit from an OT operator or other user very simple preferences in terms of the treatment of the tagged traffic. In various embodiments, QoS preferences may also be specified for particular command tags (e.g., "Start CPU," etc.), thereby allowing different QoS policies to be applied, depending on the actual contents of the packets being conveyed by the network.

Based on the QoS preferences specified for the different tags, network supervisory service 312 may import the various device types, their protocols, command executions, QoS preferences, etc., from asset inventory service 320 and generate QoS policies for the network, accordingly. For instance, network supervisory service 312 may take the form of an SDN controller that is responsible for configuring the different QoS policies in the network. In turn, network supervisory service 312 may push the QoS policies to networking equipment 308 for enforcement. Note that this process can also happen actively, as new devices are discovered or tags change in real-time.

In various embodiments, a QoS policy configured by network supervisory service 312 may specify a priority based on the type of device(s), protocol(s) used by their traffic, and/or the commands or other actions performed by the traffic. Based on this, networking equipment 308 may identify which packets from a particular device require inspection, in some embodiments. For instance, if a QoS policy does not distinguish between packets at the command level for a certain protocol, and simply applies a set priority for all packets using that protocol, inspection of the contents of those packets may not be necessary.

For packets that require inspection, the sensors deployed in networking equipment 308 may perform DPI or another form of inspection, to discern the tags for that packet that may match a QoS policy defined by network supervisory service 312. In turn, networking equipment 308 may enforce the matched QoS policy to that packet. For instance, in one embodiment, networking equipment 308 may apply a particular DSCP to the packet, based on the QoS policy that matches the tag(s) for that packet. All subsequent packets that are part of the command function may also be given the same QoS treatment, once identified. As different commands are detected by networking equipment 308 with varying levels of prioritization, these may be given high or lower QoS treatment, in the same manner.

By way of example, assume that HMI 310 sends a packet to controller 306 that uses a particular industrial automation protocol to send a command to controller 306 (e.g., a control command for an actuator in industrial equipment 304). A sensor within networking equipment 308 may inspect this packet and identify the protocol and command. Now, assume that this particular protocol and command have an associated QoS policy that specifies that any matching packets with that protocol and delivering that command should be sent with high priority. In such a case, networking equipment 308 may send the packet on to its destination with that priority.

Now, assume that HMI 310 sends another packet to controller 306 that uses the same industrial automation protocol, but the contents of the packet include a different type of command than above (e.g., a request for data, etc.). Further, assume that this command has a different QoS policy that specifies that any matching packets may be sent with a default priority. In such a case, networking equipment 308 may send that packet on to its destination with that default priority. Thus, even though the two example packets utilize the same industrial automation protocol, they may be treated very differently by the network, from a QoS standpoint.

It is important to note that while the QoS preferences expressed by an operator is typically a one-time operation, the enforcement of the resulting QoS policies is dynamic and ongoing. This is not to say that the policies cannot ever be changed or revisited. Rather, once the intent has been expressed, no further input is needed until the intent requires revision or expansion.

In some embodiments, network supervisory service 312 may also provide reporting via a GUI, thereby allowing the network operator(s) to review how their expressed intents affected the traffic performances across the network. For instance, one such report may indicate the throughput, packet loss, network latency, application server latency, or the like, for a given tag or set of tags (e.g., specific device types, protocols, commands, etc.).

Figure 8:
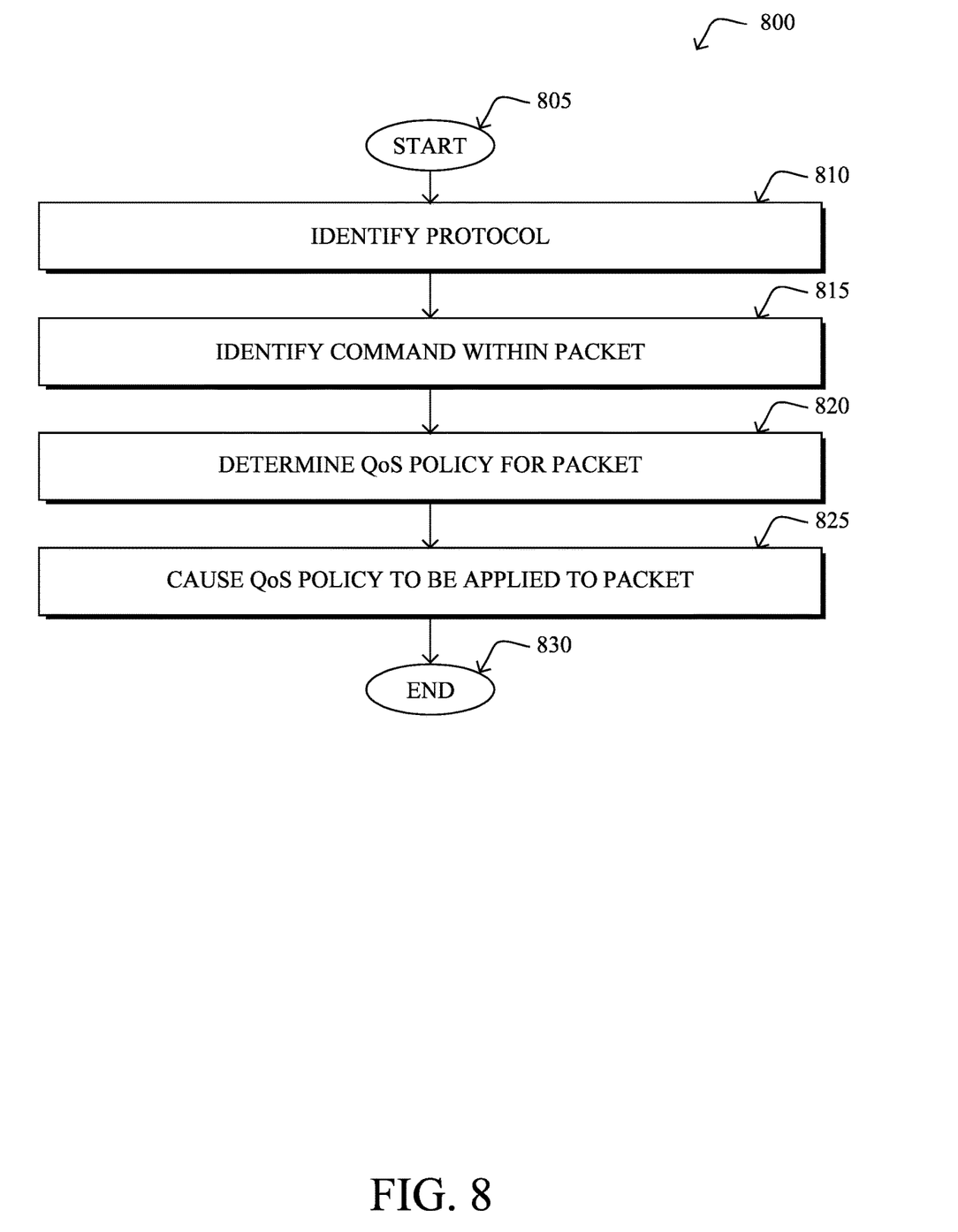
FIG. 8 illustrates an example simplified procedure for applying command-level QoS policies in a network.

FIG. 8 illustrates an example simplified procedure for applying command-level QoS policies in a network, in accordance with one or more embodiments described herein. In various embodiments, a non-generic, specifically configured device (e.g., device 200), or set of such devices, may function as a service for a network. The procedure 800 may start at step 805, and continues on to step 810 where, as described in greater detail above, the service may identify a packet sent by a first device in the network to a second device in the network as being of a particular protocol. For instance, the protocol may be identified by performing DPI or other packet inspection technique on the packet. For instance, the particular protocol may be an industrial automation protocol (e.g., Profinet, CIP, etc.), or another protocol, as desired.

At step 815, as detailed above, the service may identify a control command within the packet for the second device, based in part on the particular protocol identified for the packet. In general, the control command may seek to cause the second device, or another device coupled to the second device, to perform a specified operation. For instance, the control command may control an actuator, request certain information, adjust one or more operating parameters, or the like.

At step 820, the service may determine, based on the control command within the packet, a QoS policy for the packet, as described in greater detail above. More specifically, the QoS policy may specify a prioritization for the packet, or other network parameters, depending on the specific command being conveyed by that packet. In further embodiments, the service may further determine the QoS policy based on other factors, as well, such as the device type of the first or second device, the particular protocol used by the packet, combinations thereof, or the like.

At step 825, as detailed above, the service may cause the QoS policy to be applied to the packet along the path via which the packet is sent from the first device to the second device. For instance, in some embodiments, the service may cause the packet to be marked with a particular DSCP marking, based on the QoS policy. As would be appreciated, procedure 800 may be performed any number of times, which may result in different packets between two devices that use that same protocol receiving different QoS treatment, depending on the commands that they convey. Procedure 800 then ends at step 830.

The techniques described herein, therefore, help to reduce resource consumption in a network by allowing for different QoS policies to be applied to packets based on the specific commands included in those packets. In doing so, only packets that include high priority commands may be sent with a high priority, while other packets sharing the same sender, receiver, protocol, etc., may receive lower QoS treatment, to avoid having to send all packets with those characteristics at the same QoS level.

While there have been shown and described illustrative embodiments for dynamic intent-based QoS policies for commands within industrial protocols, it is to be understood that various other adaptations and modifications may be made within the intent and scope of the embodiments herein. For example, while specific endpoint device types are described, the techniques can be applied to any number of different types of devices. Further, while the techniques herein are described as being performed at certain locations within a network, the techniques herein could also be performed at other locations, as desired (e.g., fully in the cloud, fully within the local network, etc.). In addition, while certain protocols are listed herein, the techniques herein are not limited as such and can be applied to other protocols, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   identifying, by a service, a packet sent by a first device in a network to a second device as being of a particular protocol that is an industrial automation protocol;
   identifying, by the service, a control command within the packet for the second device, based in part on the particular protocol identified for the packet;
   determining, by the service and based in part on the control command within the packet and an identity of the first device or of the second device that is determined using device classification, a quality of service policy for the packet;
   causing, by the service, the quality of service policy to be applied to the packet along a path in the network via which the packet is sent from the first device to the second device; and
   causing, by the service, a second quality of service policy to be applied to a second packet sent by the first device to the second device, based on a control command within the second packet, wherein the control command within the second packet differs from the control command within the packet.

2. The method as in claim 1, wherein causing the quality of service policy to be applied to the packet along the path comprises:
   causing the packet to be marked with a particular Differentiated Services Code Point (DSCP) marking.

3. The method as in claim 1, wherein the control command is identified within the packet by performing deep packet inspection (DPI) of the packet.

4. The method as in claim 1, wherein the packet and the second packet are both of the particular protocol.

5. The method as in claim 1, wherein the service determines the quality of service policy for the packet based further in part on the particular protocol.

6. The method as in claim 1, wherein the quality of service policy prioritizes the packet along the path.

7. The method as in claim 1, wherein the device classification is based on static rules, heuristics, or a machine learning-based classifier.

8. An apparatus, comprising:
one or more network interfaces to communicate with a network;
a processor coupled to the one or more network interfaces and configured to execute one or more processes; and
a memory configured to store a process that is executable by the processor, the process when executed configured to:
identify a packet sent by a first device in the network to a second device as being of a particular protocol that is an industrial automation protocol;
identify a control command within the packet for the second device, based in part on the particular protocol identified for the packet;
determine, based in part on the control command within the packet and an identity of the first device or of the second device that is determined using device classification, a quality of service policy for the packet;
cause the quality of service policy to be applied to the packet along a path in the network via which the packet is sent from the first device to the second device; and
cause a second quality of service policy to be applied to a second packet sent by the first device to the second device, based on a control command within the second packet, wherein the control command within the second packet differs from the control command within the packet.

9. The apparatus as in claim 8, wherein the apparatus causes the quality of service policy to be applied to the packet along the path by:
causing the packet to be marked with a particular Differentiated Services Code Point (DSCP) marking.

10. The apparatus as in claim 8, wherein the control command is identified within the packet by performing deep packet inspection (DPI) of the packet.

11. The apparatus as in claim 8, wherein packet and the second packet are both of the particular protocol.

12. The apparatus as in claim 8, wherein the apparatus determines the quality of service policy for the packet based further in part on the particular protocol.

13. The apparatus as in claim 8, wherein the quality of service policy prioritizes the packet along the path.

14. The apparatus as in claim 8, wherein the device classification is based on static rules, heuristics, or a machine learning-based classifier.

15. A tangible, non-transitory, computer-readable medium storing program instructions that cause a device to execute a process comprising:
identifying a packet sent by a first device in a network to a second device as being of a particular protocol that is an industrial automation protocol;
identifying a control command within the packet for the second device, based in part on the particular protocol identified for the packet;
determining, based in part on the control command within the packet and an identity of the first device or of the second device that is determined using device classification, a quality of service policy for the packet;
causing the quality of service policy to be applied to the packet along a path in the network via which the packet is sent from the first device to the second device; and
cause a second quality of service policy to be applied to a second packet sent by the first device to the second device, based on a control command within the second packet, wherein the control command within the second packet differs from the control command within the packet.

16. The tangible, non-transitory, computer-readable medium as in claim 15, wherein the device classification is based on static rules, heuristics, or a machine learning-based classifier.

* * * * *

UNITED STATES PATENT AND TRADEMARK OFFICE
CERTIFICATE OF CORRECTION

| | | |
|---|---|---|
| PATENT NO. | : 12,132,654 B2 | Page 1 of 1 |
| APPLICATION NO. | : 17/223176 | |
| DATED | : October 29, 2024 | |
| INVENTOR(S) | : Thomas Szigeti et al. | |

It is certified that error appears in the above-identified patent and that said Letters Patent is hereby corrected as shown below:

In the Specification

Column 7, Line 13 please amend as shown:
instance, a supervisory control and data acquisition Column 11, Line 18 please amend as shown:
may use to tag the various devices/components in net- Column 11, Line 56 please amend as shown:
(SLAs), such as control commands sent to robots or other Column 13, Line 37 please amend as shown:
devices 602 communicate using Profinet. Profinet Discovery Column 14, Line 3 please amend as shown:
tags (e.g., "Start CPU." etc.), thereby allowing different QoS Signed and Sealed this
Twenty-first Day of January, 2025

Coke Morgan Stewart
*Acting Director of the United States Patent and Trademark Office*